(12) United States Patent
Johnson et al.

(10) Patent No.: US 7,701,078 B1
(45) Date of Patent: Apr. 20, 2010

(54) COMMON BUS AIRCRAFT RETROFIT LOAD CONTROL

(75) Inventors: Scott V. Johnson, Scottsdale, AZ (US); John J. Martin, Gilbert, AZ (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 337 days.

(21) Appl. No.: 11/894,638

(22) Filed: Aug. 6, 2007

(51) Int. Cl.
    *B60L 1/00* (2006.01)
    *B60L 3/00* (2006.01)
    *H02G 3/00* (2006.01)

(52) U.S. Cl. .................................................. 307/9.1

(58) Field of Classification Search ............. 307/9.1; 340/538
See application file for complete search history.

(56) References Cited

U.S. PATENT DOCUMENTS

| | | | |
|---|---|---|---|
| 4,370,561 A | 1/1983 | Briggs | |
| 4,716,409 A | 12/1987 | Hart et al. | |
| 5,241,380 A | 8/1993 | Benson et al. | |
| 5,577,990 A | 11/1996 | Widjaja et al. | |
| 5,599,274 A | 2/1997 | Widjaja et al. | |
| 6,230,089 B1 | 5/2001 | Lonn et al. | |
| 6,326,704 B1 | 12/2001 | Breed et al. | |
| 6,559,777 B1 | 5/2003 | Martin et al. | |
| 6,664,656 B2 * | 12/2003 | Bernier ........................ | 307/9.1 |
| 6,733,036 B2 | 5/2004 | Breed et al. | |
| 6,800,957 B2 | 10/2004 | Nerone et al. | |
| 7,055,994 B2 | 6/2006 | Martin | |
| 7,082,359 B2 | 7/2006 | Breed | |
| 7,195,318 B2 | 3/2007 | Cha et al. | |
| 7,202,613 B2 | 4/2007 | Morgan et al. | |

\* cited by examiner

*Primary Examiner*—Fritz M Fleming
*Assistant Examiner*—Carlos Amaya
(74) *Attorney, Agent, or Firm*—AFMCLO/JAZ; Gerald B. Hollins; Daniel J. Krieger

(57) ABSTRACT

A retrofit energization arrangement especially suitable for an aircraft wherein original factory-placed wiring can be reused in common bus form for plural new loads in order to avoid the expense and hazard of disassembling original wiring bundles for new conductor incorporation. Serviceable wiring possibly earlier retired in place or becoming unneeded from equipment removal can, by way of the invention, be used for plural diverse new loads including loads of disparate operating cycle and current requirements for example, even though energized via a common bus. In the disclosed apparatus both energizing current and load control signals are transmitted via the same electrical bus between control location and load areas of the aircraft where control decoding and energy tap-off occur, the latter by switch mode power supply if needed. Control signals of sinusoidal waveform, minimal electromagnetic and radio frequency interference character and limited existing bus filtering attenuation are disclosed; these may be embodied as the Frequency Shift Keying (FSK) or Continuous Tone Coded Squelch System, CTCSS, frequencies used in the radio communication art. Loads of differing types are disclosed as examples in the described embodiment of the invention; additional loads are feasible. Use of the invention in land vehicles, watercraft and building structures is also contemplated.

16 Claims, 5 Drawing Sheets

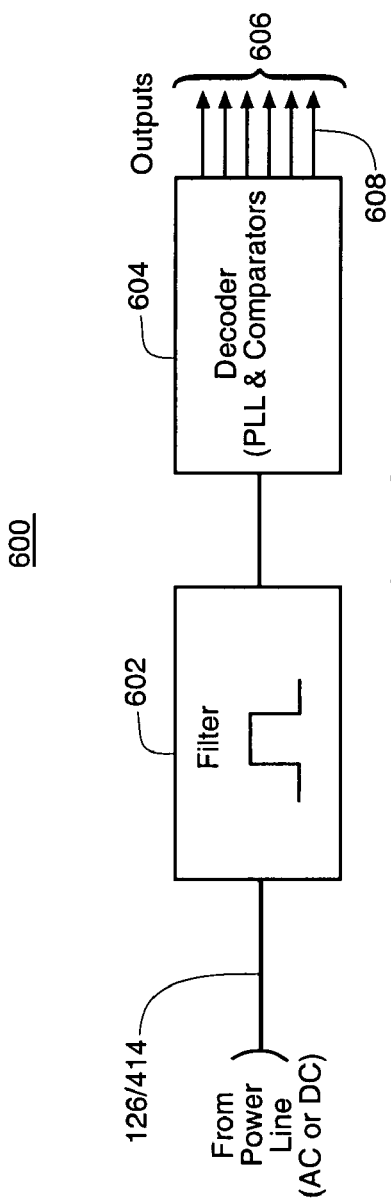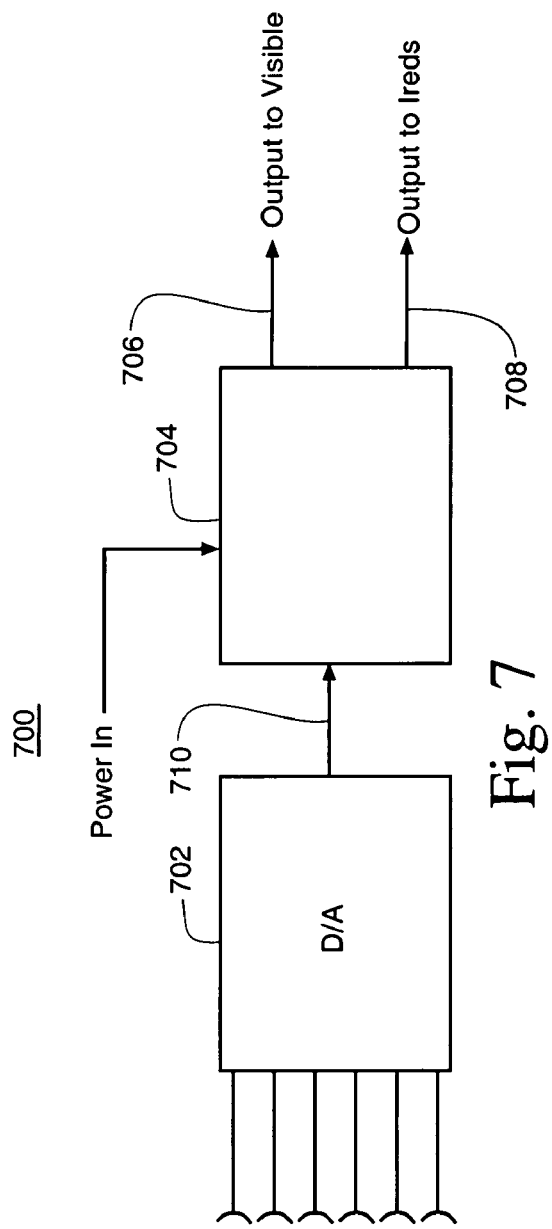

COMMON BUS AIRCRAFT RETROFIT LOAD CONTROL

RIGHTS OF THE GOVERNMENT

The invention described herein may be manufactured and used by or for the Government of the United States for all governmental purposes without the payment of any royalty.

BACKGROUND OF THE INVENTION

In the electrical energy conveyance art there is often a need to use existing inaccessible electrical wiring in order to achieve some new and originally unconsidered function. A "smart" ability to accomplish this new function can often save significant amounts of work and expense involved in a rework effort. This set of events is encountered in a plurality of differing applications of the electrical arts, i.e., in numerous fields of endeavor including buildings and transportation equipment of differing types.

One example of this situation is to be found in the electrical wiring of certain rooms in many homes especially in the United States but also other locations of the world. In these rooms, such as in a bedroom, there is originally provided a ceiling light fixture controlled by a wall mounted light switch located near the entrance door of the room. Energy for lighting the lamp of this fixture may be supplied to either of a small metal electrical box containing the wall switch or to the small metal electrical box used to mount the light fixture in the room ceiling. In either event the original house wiring often includes a single pair of lamp fixture controlling electrical conductors running between the two metal boxes, conductors that are buried and securely attached to structural members of the house before a wall covering such as plaster board or wet plaster is put in place. Such conductors are of course later inaccessible for enhancements such as an increase in conductor numbers without substantial destructive and reconstruction efforts. Local building codes in a few locations of the U.S. provide an exception to this general rule in requiring the use of "conduit" or pipe-like pathways and pulled-in conductors between these metal boxes and thus allow for new conductor retrofitting when needed. Communities around the city of Chicago, Ill. are for example known to have such local code rules. In most locations however original wiring is of the "Romex" or "BX" or even older "knob and tube" varieties and is thus rigidly attached to or passing through structural members of the house and is now inaccessible.

A problem with this usual wiring arrangement often arises when a new or additional usage of one or more of these boxes is contemplated, a use such as providing a combination electrical light and ceiling fan is desired in the room. When the box to box conductors are two in number, lie buried between wall surfaces and between first floor ceiling and second floor flooring and consist of flexible "Romex" or "BX" or other common two conductor residential wiring forms, the provision of a new third or additional electrical conductors for separate control of fan speed, fan direction and lamp intensities for example is a significant dilemma.

One clever solution to this electrical art dilemma has been provided by the Casablanca Fan Company located in California, USA. Combination fan and light fixtures provided by this supplier do in fact provide a plurality of differing fan speeds and directions and lamp illumination intensities all with use of only the two original conductors joining the ceiling and wall boxes! The Casablanca designers have accomplished this plurality of control functions through use of control signals coded into the sinusoid waveform of the supplied electrical energy wave. The Casablanca coding is embedded in the controlled energy wave near the sinusoid waveform zero voltage crossing points. Such coding is accomplished with wave slicing events performed by bidirectional semiconductor devices of the silicon controlled rectifier type, devices known in the art as "thyristors" or by other names proprietary to the device supplier. A more complete description of the Casablanca control is provided in a series of U.S. Patents including U.S. Pat. No. 4,716,409 issued to Casablanca designers, this and any other patent identified in this document are hereby incorporated by reference herein.

Although the Casablanca control and coding technique is elegant in design and performance it is limited by practicalities such as nearby lightning surges being often destructive of semiconductor devices when integrated into long house wiring runs, by switch contact resistance increasing over use lifetime, by generation of distorted sinusoid wave shapes (that are minimally diminished in electrical energy delivery effect but include high frequency harmonics, a possible source of radio frequency interference noise) and by the inherent applicability of the coding only to alternating current electrical energy sources. Generally it also may be stated that the Casablanca coding intentionally distorts an incoming sinusoidal wave in order to introduce the control coding as opposed to adding additional sinusoids to an incoming waveform in order to embed the control signals. The zero crossing coding of the Casablanca technique may nevertheless generally be considered as one clever and practical approach to communicating control signals by way of two energy delivery conductors and to the use of limited conductor existing wiring for new and more demanding applications.

As described herein there is additional need for arrangements somewhat of this nature in electrical applications outside of the house and building environment. It is for example particularly difficult to re-wire an aircraft in order to provide for new exterior or interior light sources or to energize other loads especially when such loads may necessitate physical dispositions at distant locations of a large airframe and thus require transmission of energy through hundreds of feet of integrally assembled and hidden factory installed wiring. Re wiring is of further increased difficulty when the wiring in an originally installed factory bundle is now characterized by electrical insulation degradation such as embrittlement or chafing or where the aircraft includes decorative or thermal insulation interior panels or other physical obstructions for examples. One needs only to consider the conclusions reached with respect to TWA flight 800 in New York to appreciate the significance of fragility in existing aircraft wiring. Aircraft rewiring is in fact so difficult and costly that the practice of "retirement in place" for original wiring has become commonplace in older aircraft, particularly in military aircraft.

In the art of improving existing aircraft with upgraded electronic systems, as has been practiced in several cycles in for example the fleet of B-52 bombers used by the U.S. Air Force since the mid 1950's, it may be convenient to reuse the electrical conductors of a somewhat large-conductor factory-wired bus of significant length and advantageous physical location for certain new equipment not in existence at the time of original aircraft fabrication. For example electronic equipment at the time of B-52 design was almost totally dependent on vacuum tubes and thus was characterized by low input to output efficiency, larger physical size and greater energy usage than is now experienced with integrated circuits and other semiconductor equipment. In a related manner smart missile weapons and global position system equipment for examples were completely unknown at the time of B-52 design but now are necessary additions for effective present day usage of such aircraft.

Similar examples involving the retrofitting of other aircraft are under current military consideration. The C-130 transport aircraft has been manufactured in several versions for years and certain of these versions are being considered for receipt of enhanced avionics equipment including cockpit displays and controls. Similarly the close ground support fighter aircraft commonly known as the A-10 and "warthog" has been in use for years and has also received modern equipment upgrades. The addition of night vision equipment and the provision of night vision equipment-compatible lighting both inside and outside the aircraft are additional areas of significant present military concern and are believed assisted by the present invention.

The present invention has been found especially useful in the modernization of tanker aircraft wherein both a replacement for incandescent filament lamps with light emitting diode elements and bus signal decoding electronics can all reside in the space reserved for original incandescent lamp fixtures. In such aircraft there exists, for example, a large number of light fixtures used in guiding an aircraft being refueled into correct position for engagement with the refueling boom. These fixtures are used under nighttime conditions and in both friendly and hostile airspace. Some of these guidance lamps now need to house covert or night vision related infrared characteristics in order to provide aircraft safety in hostile airspace. The present invention adds the capability to select between these multiple forms of signal illumination without need to provide additional lamp fixture wiring and other costly and time-consuming changes.

By way of capabilities achieved in the present invention an earlier provided electrical bus, as for old and now removed electronic equipment for example in an aircraft, may be re used to energize several present day loads while the application of energy to these loads is nevertheless individually controlled from the cockpit or from some other point of the aircraft, such as an operator station. Such technique may of course also be applied to newly installed wiring and equipment where it is desirable to reduce conductor numbers, weight or bundle size. According to this arrangement, a single electrical bus may be used to control a plurality of differing loads through signal coding communicated along the same bus conveying the controlled energy. For simplification purposes herein these multiple electrical loads may be represented by light sources of different character located throughout the aircraft and its exterior. Such light sources are of course also possible actual loads that may be energized in this manner, all as described subsequently below herein.

SUMMARY OF THE INVENTION

The present invention therefore provides for the re use of existing electrical wiring to supply electrical energy to a remote load device such as a lamp fixture or light emitting diode fixture or other load especially in an aircraft or other vehicle setting.

It is therefore an object of the present invention to provide bus energized individual load control arrangement responsive to control signals received via common energy bus conductors.

It is another object of the invention to provide remote load control signals that are sinusoidal in nature.

It is another object of the invention to provide remote control of individual electrical loads fed by a common bus.

It is another object of the invention to provide remote load control signals having a selectable plurality of simultaneous sinusoid frequencies.

It is another object of the invention to provide a remote load control arrangement of limited electromagnetic interference generation characteristics.

It is another object of the invention to provide a remote load control arrangement suitable for use with a variety of different load types and load environments.

It is another object of the invention to provide a remote load control arrangement usable to select a variety of characteristics in remote load devices.

It is another object of the invention to provide a remote load control arrangement usable in vehicular and building and other settings.

It is another object of the invention to provide a common bus remote load control arrangement having especially desirable utility in a large aircraft setting.

It is another object of the invention to provide an electrical load control arrangement that is suited for usage in new aircraft or in modernized older aircraft.

These and other objects of the invention will become apparent as the description of the representative embodiments proceeds.

These and other objects of the invention are achieved by aircraft electrical retrofit apparatus comprising the combination of:

a source of aircraft electrical load energization energy received in said aircraft;

an aircraft control location proximate source of selectable low level alternating current electrical load control signals impressed on an electrical output of said source of aircraft electrical load energization energy to form a modulated energy signal;

a newly added aircraft electrical energy load device remotely disposed in said aircraft with respect to said source of aircraft electrical load energization energy and said source of low level alternating current electrical control signals;

an electrical conductor within an undisturbed original wiring bundle of said aircraft said conductor being disposed between a combination of said source of aircraft electrical load energization and said control location proximate source of low level alternating current electrical load control signals at a first end thereof and a remote new load driver circuit at a second more remote aircraft location end thereof;

a load control signal decoder circuit disposed at said second more remote aircraft location and connected intermediate said second end of said electrical conductor and said remote new load driver circuit, said decoder circuit being responsive to said low level alternating current electrical load control signals received via said conductor and generating therefrom a remote load driver circuit controlling signal.

BRIEF DESCRIPTION OF THE DRAWINGS

The accompanying drawings incorporated in and forming a part of this specification, illustrate several aspects of the present invention and together with the description serve to explain the principles of the invention. In these drawings:

FIG. 6 shows a block diagram of a remote load control signal decoder usable in the present invention.

FIG. 7 shows a block diagram of a controllable power supply usable with the present invention.

DETAILED DESCRIPTION

Figure 1:
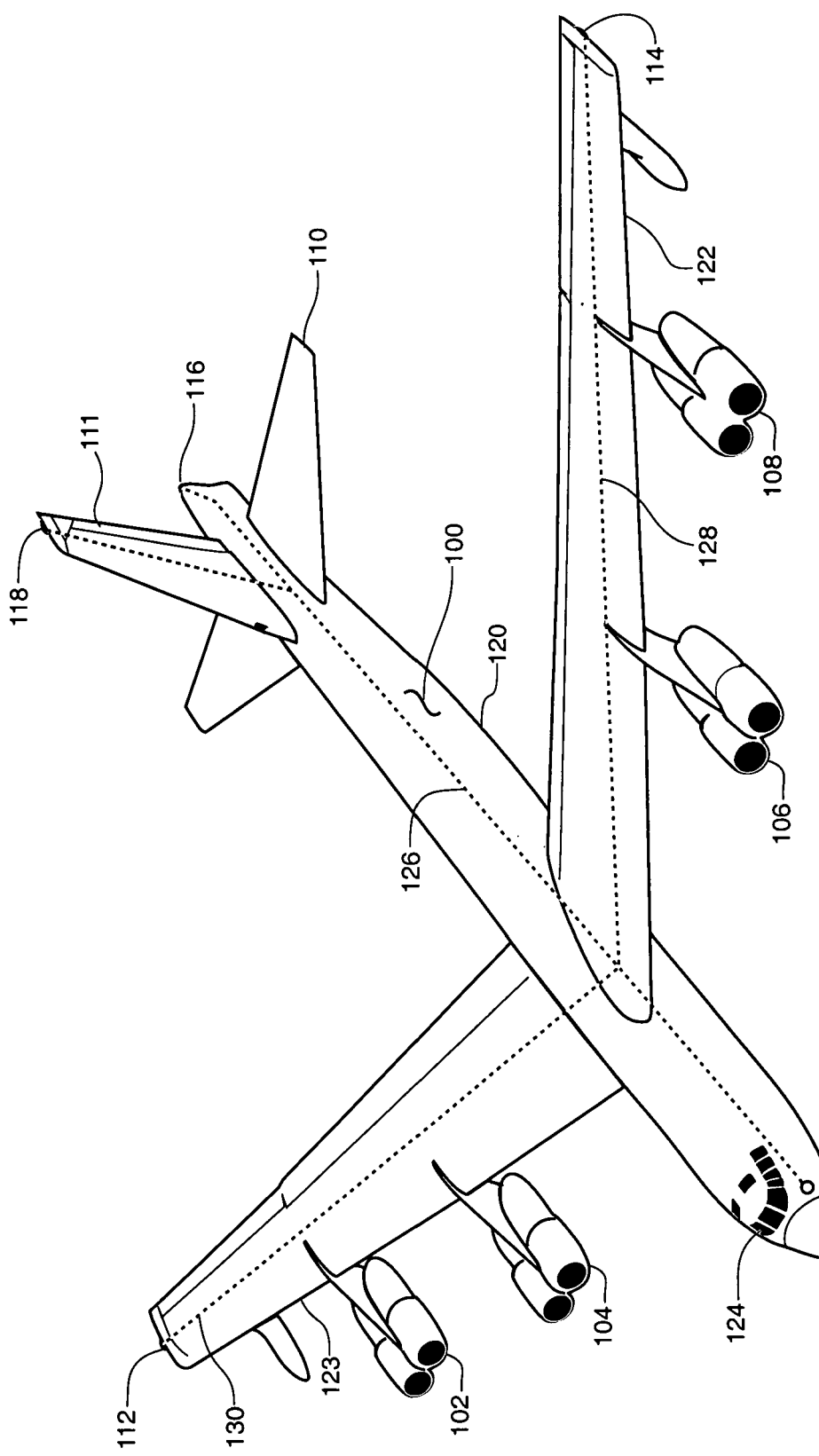
FIG. 1 shows a representative aircraft inclusive of a remote load control arrangement according to the present invention.

FIG. 1 in the drawings shows a representative larger size aircraft inclusive of a remote load control arrangement according to the present invention. In the FIG. 1 drawing the aircraft 100 may be considered to be a B-52 or a C-5 or a C-17 or C-130 or a C-135 or A-10 or other aircraft. This aircraft is provided with the four jet type engines 102, 104, 106 and 108, a fuselage 120, wing sections 122-123, an elevator assembly 110 and a rudder system 111, all as are conventional for such aircraft. Attached to extremities of the wings 122 and 123, the rudder system 111 and the fuselage 120 are aircraft external light source fixtures 112, 114, 116 and 118 that may serve as aircraft markers and for possible additional functions such as visual signal sources.

For present invention purposes it is assumed that an electrical bus 126 of either one single conductor plus the common fuselage ground variety or of the two individually isolated conductors variety extends from the cockpit 124 to a point in the rear most or tail assembly area of the aircraft along with branches 128 and 130 extending to the extremities of the wing sections 122 and 123. This bus 126 is used in the commonly fed but individually selectable energization of loads including the light sources 112, 114, 116 and 118 and other possible loads located in bus served extremity areas of the aircraft 100. In keeping with one attribute of the present invention this bus may consist of conductors within a bundled existing assembly of wiring or may be of an individual and even newly added to the aircraft nature if desired.

Figure 2:
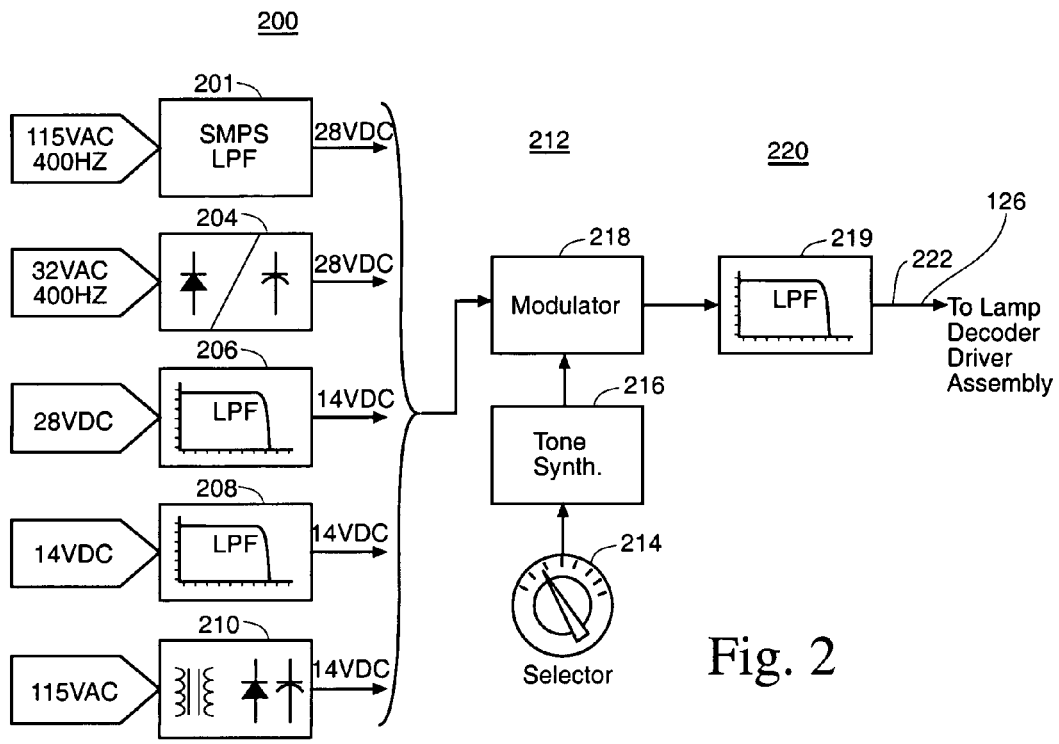
FIG. 2 shows a block diagram of a remote load control arrangement according to the present invention.

FIG. 2 in the drawings shows in block diagram form several overall details of a control system according to the present invention. The FIG. 2 details may be appropriate when the energy bus is installed in a vehicle or a building as well as in an aircraft 100. At 200 in the FIG. 2 drawing there is shown a plurality of possible main energy sources such as may be used to provide energization to the lamps or other loads attached to an existing conductor bus in for example the aircraft 100. For lamp energization purposes it is often desirable to employ low voltage electrical energy in order to use heavier and vibration-tolerant filaments in incandescent lamps and light emitting diode devices that are directly operable from the available voltage. Fourteen volts is today popular for such usage in land vehicles, twenty eight volts has been popular for use in aircraft and in military vehicles and is therefore indicated in the FIG. 2 drawing.

The bus energy sources shown at 200 in the FIG. 2 drawing include three involving alternating current electrical energy; usually such sources as are available on larger aircraft or in ground based applications of the present invention. These sources are indicated at 201, 204 and 210 in the FIG. 2 drawing and may involve either 400 Hertz or 60 Hertz energy or other alternating current sources. The two additional energy sources indicated at 206 and 208 in FIG. 2 relate most directly to aircraft and other vehicles and are of a direct current nature. Each of the energy sources shown in FIG. 2 is represented by a diamond shaped enclosure shown coupled to a succeeding rectangular block in which is disposed additional energy source components. These components may include the rectifier and energy storing capacitor at 204, the switch mode power supplies represented by the abbreviation "SMPS" and shown at 201, the low-pass filter represented by the abbreviation "LPF" and shown at 206 and 208 and the voltage changing transformer shown at 210. To a large extent any of the FIG. 2 rectangular block components may be used with any of the diamond shaped enclosure sources and may provide the fourteen or twenty eight volt direct current output energy shown at the right edge of the sources 202. Generally any of the output energy forms shown at 200 in FIG. 2 may be obtained from each combination of input energy form and rectangular block components with a suitable selection of components.

At 212 in the FIG. 2 drawing there is represented a series of components used at the input or cockpit end of an electrical energy bus, such as the bus 126 in FIG. 1, for the purpose of supplying a remote load controlling signal on the bus. As provided in the present invention this control signal is used at remote locations along the bus in selecting load energization control variables such as ON and OFF status and energization level of a load element, a load element that is often of an energy transducer nature such as an electrical energy to radiant energy lamp or an electrical energy to thermal energy transducer (a detonator squib device for example). To accomplish these functions there is included at 212 an operator selection control 214, a sinusoidal tone code signal source 216 and a mixer or modulating apparatus 218. The sinusoidal tone code signal source 216 may be arranged to generate a variety of selectable control signal frequencies and frequency combinations, for example, frequency shift keying (FSK) or continuous tone coded squelch system frequencies.

Use of an array of frequencies identified by the name of "Continuous Tone Coded Squelch System" or "CTCSS" frequencies is considered one possibility for frequencies usable at 216 in the FIG. 2 drawing for present invention load coding purposes. The "CTCSS" coding concept is believed to originate with Motorola Inc. where it has been used in the two-way radio field to provide privacy among plural users of a shared same radio frequency voice channel. This privacy is achieved by identifying each user's communication with a differing sub audible encoding tone. Each such CTCSS tone is one of about 30 to 50 possible tones, a tone often lying between 67 Hertz and 5 kilohertz in frequency for example. In such radio communication usage when an appropriate tone signal is present in a received signal the receiver muting or squelch function is disabled and the incoming signal reproduced for hearing. The audio signal band pass of a receiver accommodating such CTCSS coded signals, a voice communication receiver, may be limited in low frequency range in order to exclude the CTCSS control signal from listener detection-even though the control signal may otherwise fall within the human detectable frequency range.

"CTCSS" related concepts have also become known in the art by the name of "private line" or "PL" and by other names used by suppliers other than Motorola. The concept has also been adopted in the amateur radio equipment field and is applied there to unlock repeater equipment and for other control purposes. For "CTCSS" use the original tone frequencies were selected to provide harmonic signal separation benefits. The present invention may thus be viewed as a new use for "CTCSS" like frequency array signals, however, it is not necessary that only these frequencies be employed for present invention purposes.

It is notable with respect to the present invention that the CTCSS array of frequencies envelop or come close to the frequencies often encountered in alternating current energy distribution systems e.g., the frequency of 400 Hertz in aircraft energy sources and the frequency of 50 or 60 Hertz in ground based energy sources. In instances wherein the present invention control system is used with one of these energy frequencies it is of course necessary to distinguish between the energy frequency and nearby control signal frequencies in a control signal receiver apparatus. Various forms of signal frequency selection such as electrical wave filters and phase locked loop systems may be used for these purposes as are known in the art.

In the block 218 of FIG. 2 the mixing of synthesized "CTCSS" or FSK code signals with the bus energy is accomplished. In other words sinusoidal control signals are impressed on the bus input energy in the block 218 notwithstanding which of the possible combinations of input energy, rectangular block processing and output energy from the processing at 202 is employed. Impression of the control signals on the direct current energy supplied to the bus can be accomplished in the manner described in subsequent drawings herein. In situations where rapidity of response of the controlled load is required, frequency shift keyed control signals may be used advantageously in place of CTCSS signals in the interest of faster response times.

The low pass filtering shown at 219 in the FIG. 2 drawing allows the load energization energy and the impressed control signals to pass while attenuating undesired higher frequency components that if present could radiate from the bus 126 into the FIG. 1 aircraft or beyond. The output of the low pass filter at 219 may be connected directly to an input port along the bus 126 as is indicated by the double identification numbers of the filter output at 222 and 126 in the FIG. 2 drawing.

Figure 3:
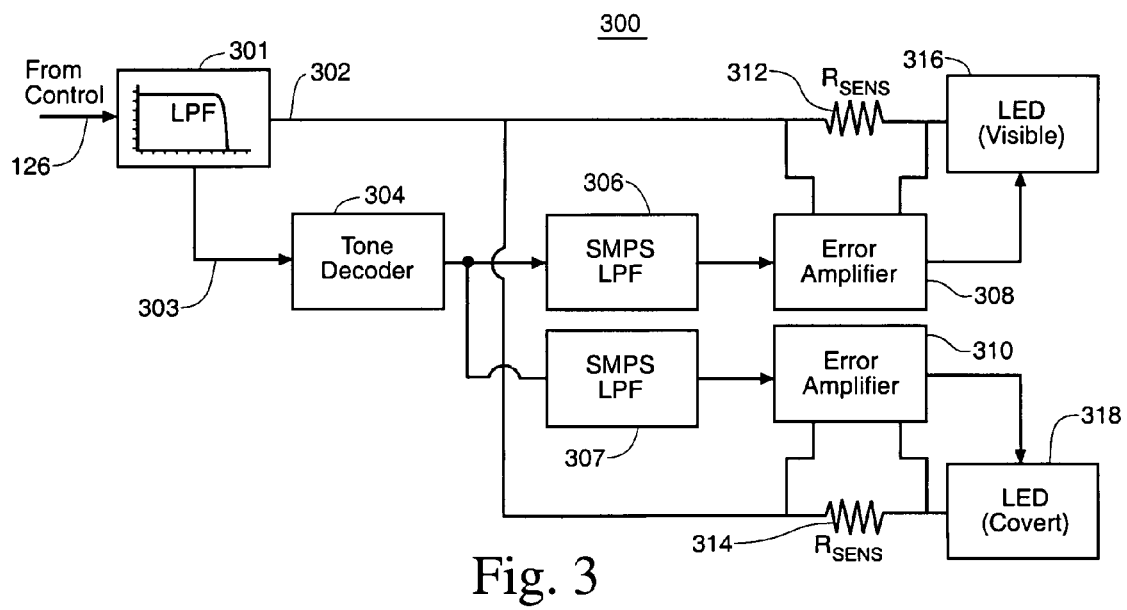
FIG. 3 shows a combined block diagram and fundamental schematic diagram of a remote load control arrangement according to the present invention.

FIG. 3 in the drawings shows at 300, in block diagram form, an array of components usable to decode the sinusoidal signals impressed on energy bus 126 in FIG. 1 at each possible load location along this bus; i.e., one of a plurality of such decoding and energy coupling circuits desired for aircraft 100 usage of the present invention. In the FIG. 3 apparatus the coded and energy delivery components of an input signal received from bus 126 are segregated by a low pass filter 301 into direct current energy at 302 and sinusoidal control signals at 303. The direct current energy is sent to for example lamp or light emitting diode driver circuits 316 and 318 through the current sensing series connected resistors 312 and 314. The sinusoidal control signals are sent to a tone decoder circuit 304 for identification and conversion into a form usable to enable the error amplifiers 308 and 310 and the switching mode power supplies (SMPS) 306 and 307.

By way of sensing voltage drop across the series connected current sensing resistors 312 and 314 the error amplifiers 308 and 310 maintain the for example lamp or light emitting diode load elements represented at 316 and 318 in FIG. 3 in a desired range of illumination current in closed loop fashion. This energization provides a selected one of visible output from one aircraft mounted light emitting diode fixture 316 and limited spectrum covert output from an alternate aircraft mounted light emitting diode fixture, the covert emission fixture 318. A selected one of or both of these fixtures can be energized at any given instant in an operating scene in order to provide a desired identification/marking of an aircraft such as the aircraft 100 in FIG. 1.

Notwithstanding this illumination flexibility, both the energy and the control signals for such fixtures can be communicated via a single electrical bus according to the present invention. Moreover according to the invention this single electrical bus can be simultaneously controlling and energizing other loads at different locations along the bus 126 by way of additional of the FIG. 3 circuits. The illuminations at 316 and 318 may be coincident in time or in time sequence with the addition of appropriate time related signals to the error amplifiers 308 and 310 or at other points in the FIG. 3 system. This load control flexibility can of course extend to intentionally intermittent energization of a load when needed; input of an intermittent control signal to one position of selector switch 214 for example can be used for this purpose.

A selected encoding of sub audible tones provides a possible error resistant addition to the heretofore described present invention. Coding of this nature is resistant to errors such as may be caused by induced interference from other systems or from electromagnetic interference and radio frequency interference sources in an aircraft for example. Golay coding is for example a branch of the applied mathematics art and is an error prevention code of the desired type. Golay coding is discussed in a plurality of technical publications including the article "Golay Codes" authored by Melissa Kanemasu and appearing in the MIT Undergraduate Journal of Mathematics. This article and numerous others concerning Golay codes are available through use of the World Wide Web and a search engine inquiry regarding the topic.

Figure 4:
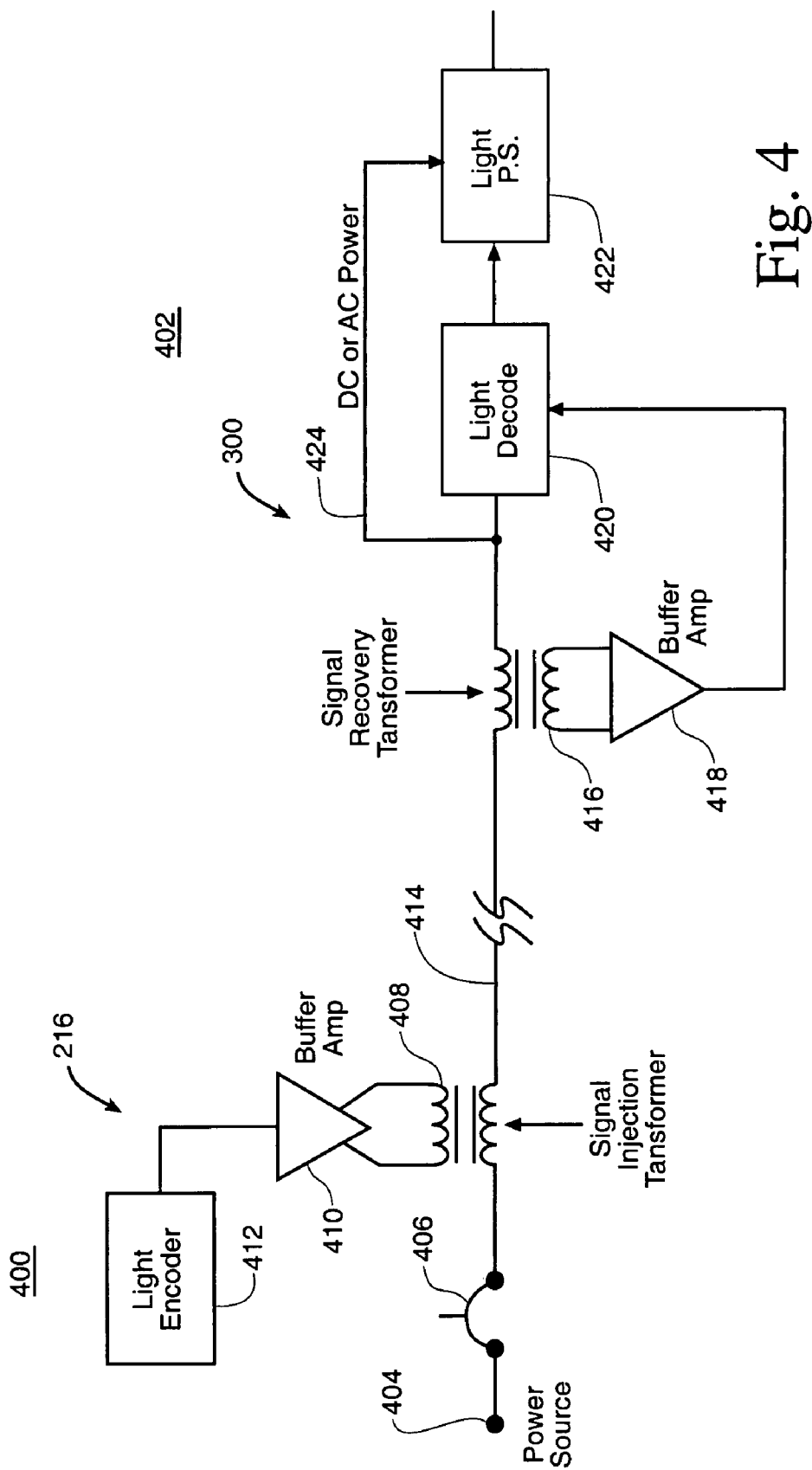
FIG. 4 shows a simplified overall diagram of a remote load control arrangement according to the present invention.

FIG. 4 in the drawings shows a combination block and schematic diagram for a single load remote load control arrangement according to the present invention. In the FIG. 4 drawing the FIG. 2 signal source apparatus at 216 appears approximately at 400 and the signal decoding apparatus at 300 in FIG. 3 appears approximately at 402. In the FIG. 4 diagram a source of electrical energy 404 is coupled through a circuit breaker 406 to a control signal injection transformer 408 and then to an aircraft wiring conductor 414. The transformer 408 provides a coupling of load control signals, preferably sinusoidal signals, generated at 412 in FIG. 4 and amplified at 410 onto the electrical energy conveyed along the aircraft conductor 414. The conductor 414 may thus be considered to convey energy signals that are modulated by low level control signals of the CTCSS, FSK, or other types.

The electrical size of the transformers 408 and 416 in the FIG. 4 circuit as well as the current rating and output impedance characteristics of the amplifier 410 are quantitative considerations in assembling the FIG. 4 components of an invention embodiment. These considerations are of course primarily dependent on the level of load energization current flow in the conductor 414 as well as on the attainable sensitivity of the control signal buffer amplifier 418, the prevailing system environment noise level and other secondary considerations. An additional factor to be considered in selecting these components is the nature of the load energization energy i.e., whether it is of the direct current nature shown herein or of the also feasible alternating current nature. Clearly for example a physically smaller transformer at 408 and at the below discussed transformer 416 location are realistic if the load energization energy is of 400 Hertz frequency than if it is of 60 Hertz nature. Additionally with use of larger sized power transistors, suitable feedback arrangements and a low output impedance in the output stage of the amplifier 410 the coupling of load current components backward through the transformer 408 can be limited and an impression of sufficient control signal amplitude onto the conductor 414 assured regardless of the small or larger aircraft load to be driven by the FIG. 4 circuit.

In the load end circuits 402 of the signal conductor 414 the transformer 416 recovers the sinusoidal control signal injected at 408 in FIG. 4 and couples this control signal to the decoder circuits 420 by way of the amplifier 418. Following the signal recovery in transformer 416 the remaining load energization energy is conveyed along the path 424 to a load or light power supply 422. Functional operation of this power supply both with respect to load ON or OFF state and load energization level is determined by way of the decoded control signal from block 420. This signal is again preferably sinusoidal in nature and may be of the decoded CTCSS signal (s) nature. Additional information regarding the block 420 circuit and other FIG. 4 circuits is disclosed in the ensuing paragraphs and drawings herein.

Figure 5:
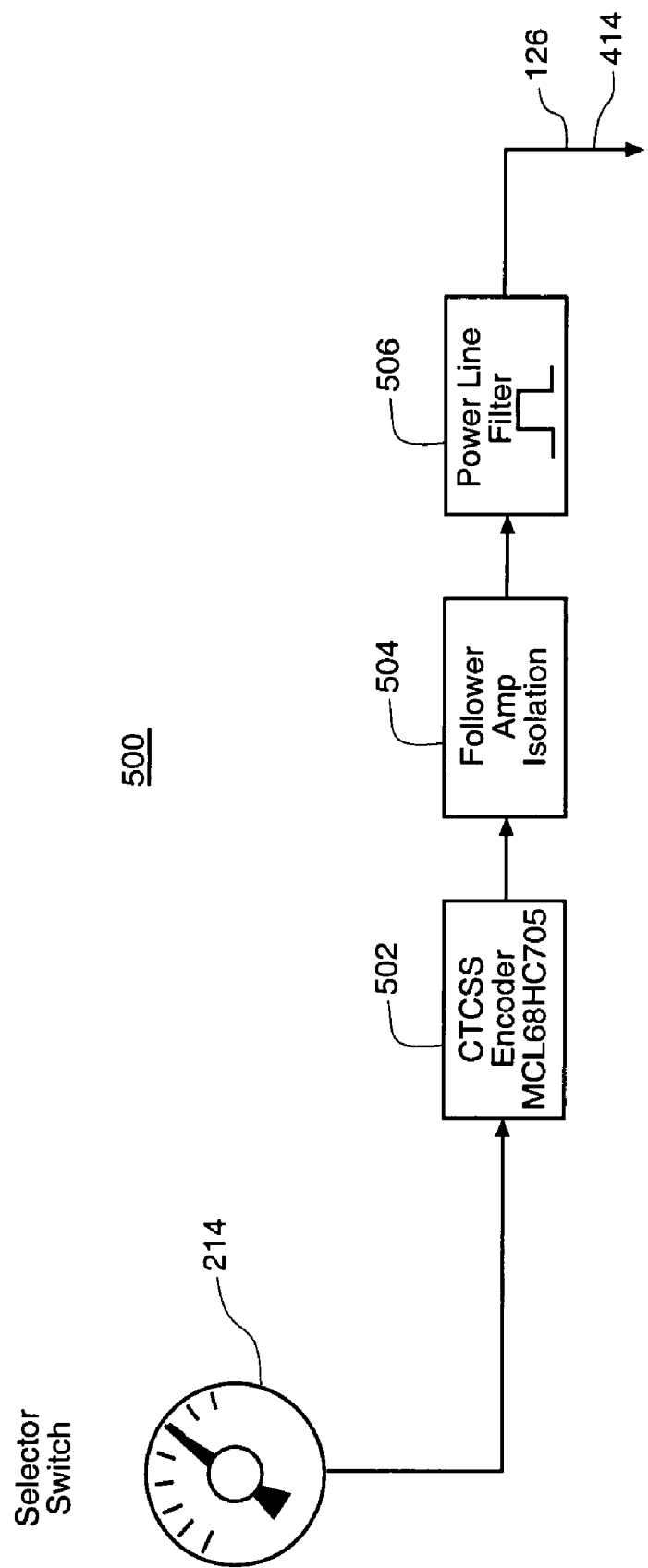
FIG. 5 shows a block diagram of a remote load control signal encoder usable in the present invention.

FIG. 5 in the drawings herein shows additional details of the control signals determination apparatus 500 as generally appears at 400 in the FIG. 4 drawing. In the FIG. 5 circuit apparatus the selector switch 214, first appearing in the FIG. 2 drawing, is again shown. This switch provides ability for a pilot or other person at the sending end of the electrical bus 126/414 to choose one of or a combination of load controlling coded sinusoid signals for communication along the electrical bus 126 and select the one or plurality of aircraft loads for current time energization. The switch 214 chosen code signals are generated in the block 502 of FIG. 5 where circuitry fabricated around a Motorola MCL 68HC705 integrated circuit device for example may be used for control signal tones generation. The generated tone signals are amplified and provided with the low output impedances discussed previously in the amplifier 410/504 shown connected with the tone generator at 502. A power line filter shown at 506, generally a multiple poled low pass filter, can be used to attenuate undesired noise or other spurious signals tending to communicate in either direction with the bus 126 in the FIG. 5 circuit.

FIG. 6 in the drawings shows details of an embodiment of the control tone decoder circuit represented at 420 in the FIG. 4 drawing. In the FIG. 6 circuit 600 another filter circuit 602, generally of the same type as described at 506 in FIG. 5, may be used the couple the electrical bus 126/414 to a tone signal decoder circuit 604 where one or multiple tone signals impressed on the electrical bus 126/414 cause activation of one or more of the individual load selector output signals indicated at 606 in FIG. 6. The tone signal decoder circuit 604 may for example include a phase locked loop circuit and a series of comparator circuits, one for the output signal at 608 and each of the other output circuits at 606. Generally each of these comparator circuits maintains one of output signals 606 in the active state so long as the related tone control signal can be detected on the electrical bus 126/414.

FIG. 7 in the drawings shows details of an embodiment of the light power supply circuit represented at 422 in the FIG. 4 drawing. In the FIG. 7 circuit 700 a digital to analog converter apparatus represented at 702 may be used to generate an analog signal at 710 for driving for example the dual current mode power supply represented at 704. Each output 706 and 708 of the power supply 704 may be coupled to an individual one of the remotely located load devices of the aircraft 100 in FIG. 1. As shown in the FIG. 7 drawing the remotely located load devices are represented as one visible light emitting diode external fixture of the aircraft 100 and one covert, e.g. infrared light emitting diode external fixture, of the aircraft 100. Other load devices such as weapons dispensers or defensive device dispensers for examples may be controlled by the circuit 704 or by the plurality of such circuits contemplated in a large aircraft use of the present invention.

Plural present invention improvements result from use of sinusoidal tones communicated over existing conductors conveying power to the remote devices to command changes in the performance of the remote devices. Since the frequency of the tones is low and waveforms are sinusoidal in nature, such tones will readily pass through filter networks that may already exist in the lighting or power systems of vehicles for example; filters that would otherwise block higher frequency tones. In view of the tones readily passing through any such filters no additional or dedicated conductors for carrying control signals are needed between control point location(s) and controlled light fixture locations nor do existent filter networks otherwise needed for other functions need to be changed. As a result of the sinusoidal waveform used little or no electromagnetic interference and very little or no radio frequency interference is generated. Such interference is undesirable and often intolerable in many military vehicle and aircraft situations since it may, for example, interfere with "intercom" operations as well as limit aircraft stealth characteristics. The use of sinusoidal tones for control is thus believed a significant improvement in the control art.

Thus the present invention provides for the control of light source fixture operation and other loads on for example aircraft and on other vehicles or on stationary structures where intensity and other operating parameters are to be controlled from a remote location such as elsewhere in the vehicle through use of existing power conductors. An advantage of the invention is that it is flexibly adaptable to function with systems having widely different energy supply characteristics, e.g. direct current or alternating current at low or high voltages and large or small load current levels while at the same time avoiding the need for destruction and reconstruction of existing wiring arrangements, being free of large electromagnetic interference generation and enabling control of multiple and diverse loads.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. Aircraft retrofit remote load controlling apparatus for retrofitting an aircraft having a preexisting conductor bus, the apparatus comprising the combination of:

a newly added electrical energy to alternate form energy transducer load element received in remote location mounting in said aircraft;

a source of transducer load element energizing direct current electrical energy located within said aircraft;

a preexisting electrical conductor in said preexisting conductor bus joining a central location of said aircraft with said remote location, said preexisting conductor connecting said newly added electrical energy to alternate form energy transducer load element through a remote transducer control element to said source of transducer energizing electrical energy; and a newly added central location electrical conductor energization controller including a source of sinusoidal alternating current electrical energy modulating said transducer energizing direct current electrical energy received in said preexisting electrical conductor and in said remote transducer control element in response to a selection signal input to said newly added energization controller;

said remote transducer control element determining characteristics of said energizing electrical energy received in said new energy transducer load element in accordance with said sinusoidal alternating current electrical energy modulating of said transducer energizing direct current electrical energy received in said preexisting electrical conductor and in said remote transducer control element in response to a selection signal input to said newly added energization controller.

2. The aircraft retrofit remote load controlling apparatus of claim 1 wherein said newly added energization controller is placed at a location other than the cockpit of the aircraft.

3. The aircraft retrofit remote load controlling apparatus of claim 1 wherein said newly added electrical energy to alternate form energy transducer load element includes a light emitting diode element.

4. The aircraft retrofit remote load controlling apparatus of claim 1 wherein said newly added electrical energy to alternate form energy transducer load element includes an aircraft exterior disposed, night vision apparatus compatible, light emitting diode element.

5. The aircraft retrofit remote load controlling apparatus of claim 1 wherein said remote transducer control element determined characteristics of said energizing electrical energy include one of an enabled/disabled load energization characteristic, an amplitude control characteristic, and a time dependent waveform characteristic of said electrical energy.

6. The aircraft retrofit remote load controlling apparatus of claim 1 wherein said source of sinusoidal alternating current electrical energy includes Continuous Tone Coded Squelch System signal frequencies.

7. The aircraft retrofit remote load controlling apparatus of claim 1 wherein said source of sinusoidal alternating current electrical energy includes a plurality of simultaneously present differing sinusoidal frequencies.

8. The aircraft remote load controlling apparatus of claim 1 wherein said source of sinusoidal alternating current electrical energy includes frequency shift keyed sinusoidal waveforms.

9. The aircraft retrofit remote load controlling apparatus of claim 1 further including a plurality of said remote transducer control elements selectively dispersed along a lengthwise extent of said electrical conductor in said array of aircraft original wiring conductors.

10. The aircraft retrofit remote load controlling apparatus of claim 1 wherein said remote transducer control element includes a switch mode power supply intermediate said electrical conductor and said remote load.

11. An existing conductor remotely controlled retrofit method of controlling irradiance output of an aircraft newly mounted electrical energy to radiant energy transducer lamp, the newly mounted transducer lamp being coupled to the aircraft original electrical energy conductor bus, said method comprising the steps of:

coupling a newly added energization controller to the aircraft original electrical energy conductor bus;

energizing said transducer lamp with direct current electrical energy supplied by way of the aircraft original wiring electrical energy conductor bus;

controlling current flow in said transducer lamp and said conductor bus with the newly added energization controller by modulating conductivity level in a transducer lamp-adjacent semiconductor device series connecting with said transducer lamp and said energy conductor bus; and selecting conductivity level in said semiconductor device in response to differing sinusoidal frequency signals impressed on said aircraft original electrical energy conductor bus by a bus origin end-disposed modulating circuit controlled by the newly added energization controller.

12. The existing conductor remotely controlled retrofit method of controlling irradiance output of an aircraft mounted electrical energy to radiant energy transducer lamp of claim 11 wherein said current level modulating in said controlling step also includes ON and OFF control of said current flow.

13. The existing conductor remotely controlled retrofit method of controlling irradiance output of an aircraft mounted electrical energy to radiant energy transducer lamp of claim 11 wherein said differing sinusoidal frequency signals in said selecting of conductivity level in said semiconductor device step include continuous tone coded squelch system (CTCSS) frequencies or frequency shift keyed frequencies.

14. The existing conductor remotely controlled retrofit method of controlling irradiance output of an aircraft mounted electrical energy to radiant energy transducer lamp of claim 11 wherein said step of controlling current flow in said transducer lamp and said conductor bus includes controlling a plurality of said electrical energy to radiant energy transducer lamps and a resulting summation of conductor bus current flows from said controlled lamps by modulating conductivity level in a plurality transducer lamp-adjacent semiconductor devices each series connecting with selected of said transducer lamps.

15. The existing conductor remotely controlled retrofit method of controlling irradiance output of an aircraft mounted electrical energy to radiant energy transducer lamp of claim 11 wherein said controlled transducer lamps include externally mounted visible and covert spectrum lamps.

16. The existing conductor remotely controlled retrofit method of controlling irradiance output of an aircraft mounted electrical energy to radiant energy transducer lamp of claim 11 wherein said lamp is one of a light emitting diode, an incandescent filament lamp and a gas-filled lamp.

* * * * *